United States Patent
Egi et al.

(10) Patent No.: US 9,672,167 B2
(45) Date of Patent: Jun. 6, 2017

(54) RESOURCE MANAGEMENT FOR PERIPHERAL COMPONENT INTERCONNECT-EXPRESS DOMAINS

(71) Applicant: Futurewei Technologies, Inc., Plano, TX (US)

(72) Inventors: Norbert Egi, Santa Clara, CA (US); Robert Lasater, Menlo Park, CA (US); Thomas Boyle, Santa Clara, CA (US); John Peters, Sunnyvale, CA (US); Guangyu Shi, Cupertino, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 213 days.

(21) Appl. No.: 14/315,099

(22) Filed: Jun. 25, 2014

(65) Prior Publication Data
US 2015/0026385 A1     Jan. 22, 2015

Related U.S. Application Data

(60) Provisional application No. 61/857,031, filed on Jul. 22, 2013.

(51) Int. Cl.
*G06F 13/14*     (2006.01)
*G06F 13/16*     (2006.01)
(Continued)

(52) U.S. Cl.
CPC .......... *G06F 13/161* (2013.01); *G06F 9/5005* (2013.01); *G06F 13/4036* (2013.01); *H04L 47/785* (2013.01)

(58) Field of Classification Search
None
See application file for complete search history.

(56) References Cited

U.S. PATENT DOCUMENTS 7,340,578 B1 *  3/2008  Khanzode ............ G06F 3/0605
                                                         707/999.2
8,429,325 B1     4/2013  Onufryk et al.
(Continued)

FOREIGN PATENT DOCUMENTS

CN       201369046 Y    12/2009
CN       103038758 A     4/2013
(Continued)

*Primary Examiner* — Ilwoo Park
(74) *Attorney, Agent, or Firm* — Futurewei Technologies, Inc.

(57) ABSTRACT

Embodiments of the present invention provide a solution for managing inter-domain resource allocation in a Peripheral Component Interconnect-Express (PCIe) network. One processor among a plurality of link processors is elected as a management processor. The management processor obtains information about available resources of PCIe network. When a resource request from a request processor is received, the management processor allocates a resource of the available resources to the requesting processor. The management processor instructs one or more link processors to program one or more inter-domain NTBs through which the traffic between the allocated resource and the requesting processor is going to flow according to the memory address information of the allocated resource, to allow cross-domain resource access between the requesting processor and the allocated resource.

16 Claims, 4 Drawing Sheets

(51) Int. Cl.
*G06F 13/40* (2006.01)
*G06F 9/50* (2006.01)
*H04L 12/915* (2013.01)

(56) References Cited

U.S. PATENT DOCUMENTS

| | | | |
|---|---|---|---|
| 8,589,613 | B2 | 11/2013 | Griggs |
| 2005/0188191 | A1* | 8/2005 | Yoshida ................ G06F 9/5011 713/1 |
| 2006/0259810 | A1* | 11/2006 | Hosoya ................ G06F 9/5011 714/4.1 |
| 2010/0088456 | A1 | 4/2010 | Chu |
| 2010/0100655 | A1* | 4/2010 | Dowedeit ............... G06F 9/526 710/200 |
| 2011/0119423 | A1* | 5/2011 | Kishore ................ G06F 13/102 710/302 |
| 2011/0202701 | A1 | 8/2011 | Maitra |
| 2011/0238909 | A1 | 9/2011 | Kumar et al. |
| 2011/0282963 | A1 | 11/2011 | Shimahara et al. |
| 2011/0302349 | A1 | 12/2011 | Griggs |
| 2013/0054867 | A1 | 2/2013 | Nishita |
| 2014/0059265 | A1* | 2/2014 | Iyer ....................... G06F 9/5011 710/313 |

FOREIGN PATENT DOCUMENTS

| | | |
|---|---|---|
| CN | 103092676 A | 5/2013 |
| CN | 103312720 A | 9/2013 |
| CN | 103353861 A | 10/2013 |
| CN | 103384551 A | 11/2013 |
| EP | 2515241 A2 | 10/2012 |
| JP | 2012073660 | 4/2012 |
| JP | 2013045236 | 3/2013 |
| WO | 2011/022375 A1 | 2/2011 |
| WO | 2012157103 | 11/2012 |

\* cited by examiner

RESOURCE MANAGEMENT FOR PERIPHERAL COMPONENT INTERCONNECT-EXPRESS DOMAINS

CROSS-REFERENCE TO RELATED APPLICATIONS

This application claims priority to U.S. provisional application No. 61/857,031, filed on Jul. 22, 2013 and entitled "Cascading PCI-Express network domains," which is incorporated herein by reference in its entirety.

TECHNICAL FIELD

The application generally relates to a Peripheral Component Interconnect-Express (PCIe) network, specifically, to a technology for managing inter-domains resource allocation on the PCIe network.

BACKGROUND

PCI-Express (PCIe) as the successor of the PCI (Peripheral Component Interconnect) technology is the most widely used means to interconnect CPUs and their peripherals deployed within Personal Computers (PCs) or servers. It is a high throughput, low-latency, packet based and switched interconnection technology.

Multiple PCIe domains, each with its own host, i.e., a micro computer or a CPU, are interconnected by one or multiple PCIe Non-Transparent Bridges (NTB). The NTBs in this configuration are used to perform address translation between address spaces of the PCIe domains they are connected to, thereby allowing data transfer to be performed among nodes (i.e. I/O devices, CPUs, etc.) in separated PCIe domains.

PCIe networks continue to grow in size and complexity. It is expected that a need will arise for resource management across PCIe domains.

SUMMARY

An embodiment of the present invention provides an apparatus for managing inter-domain resource allocation in a Peripheral Component Interconnect-Express (PCIe) network. The PCIe network includes a plurality of PCIe domains each managed by a link processor and connected to one or more other domains via a non-transparent bridge (NTB). The apparatus includes a memory, and a management processor coupled with the memory. The management processor is configured to obtain information about available resources of the domains reported by each domain's link processor. The information about available resources includes memory address of each available resource reported. The processor is configured to store the obtained information about the available resources in the memory and receive a resource request from a requesting processor of one of the domains. In response to the resource request, the processor allocates a resource of the available resources to the requesting processor. The allocated resource resides in a domain different from the domain with the requesting processor. The processor obtain memory address information of the allocated resource from the memory, instruct one or more link processors to program one or more inter-domain NTBs through which the traffic between the allocated resource and the requesting processor is going to flow according to the memory address information of the allocated resource, to allow cross-domain resource access between the requesting processor and the allocated resource.

Another embodiment of the present invention provides a method for managing inter-domain resource allocation in a Peripheral Component Interconnect-Express (PCIe) network. The PCIe network includes a plurality of PCIe domains each managed by a link processor and connected to one or more other domains via a non-transparent bridge (NTB). A processor obtains information about available resources of the domains reported by each domain's link processor. The information about available resources includes a memory address of each available resource reported. The processor stores the obtained information about the available resources in a memory. The processor receives a resource request from a requesting processor of one of the domains. In response to the resource request, the processor allocates a resource of the available resources to the requesting processor. The allocated resource resides in another domain different from the domain with the requesting processor. The processor obtains memory address information of the allocated resource from the memory and instructs one or more link processors to program one or more inter-domain NTBs through which the traffic between the allocated resource and the requesting processor is going to flow according to the memory address information of the allocated resource, to allow cross-domain resource access between the requesting processor and the allocated resource.

The aforementioned methods may be performed by one or more processors, memory and one or more modules, programs or sets of instructions stored in the memory for performing these methods.

Instructions for performing the aforementioned methods may be included in a computer program product configured for execution by one or more processors. In some embodiments, the apparatus includes a computer readable storage medium (e.g., one or more magnetic disk storage devices, flash memory devices, or other non-volatile solid state memory devices) and an executable computer program mechanism embedded therein.

DETAILED DESCRIPTION

In order to make the aforementioned objectives, technical solutions and advantages of the present application more comprehensible, a detailed description is provided below. Reference will now be made to embodiments, examples of which are illustrated in the accompanying drawings. Insofar as block diagrams, flowcharts, and/or examples contain one or more functions and/or operations, it will be understood by those within the art that each function and/or operation within such block diagrams, flowcharts, or examples can be implemented, individually and/or collectively by a wide range of hardware, software, firmware, or any combination thereof.

Figure 1:
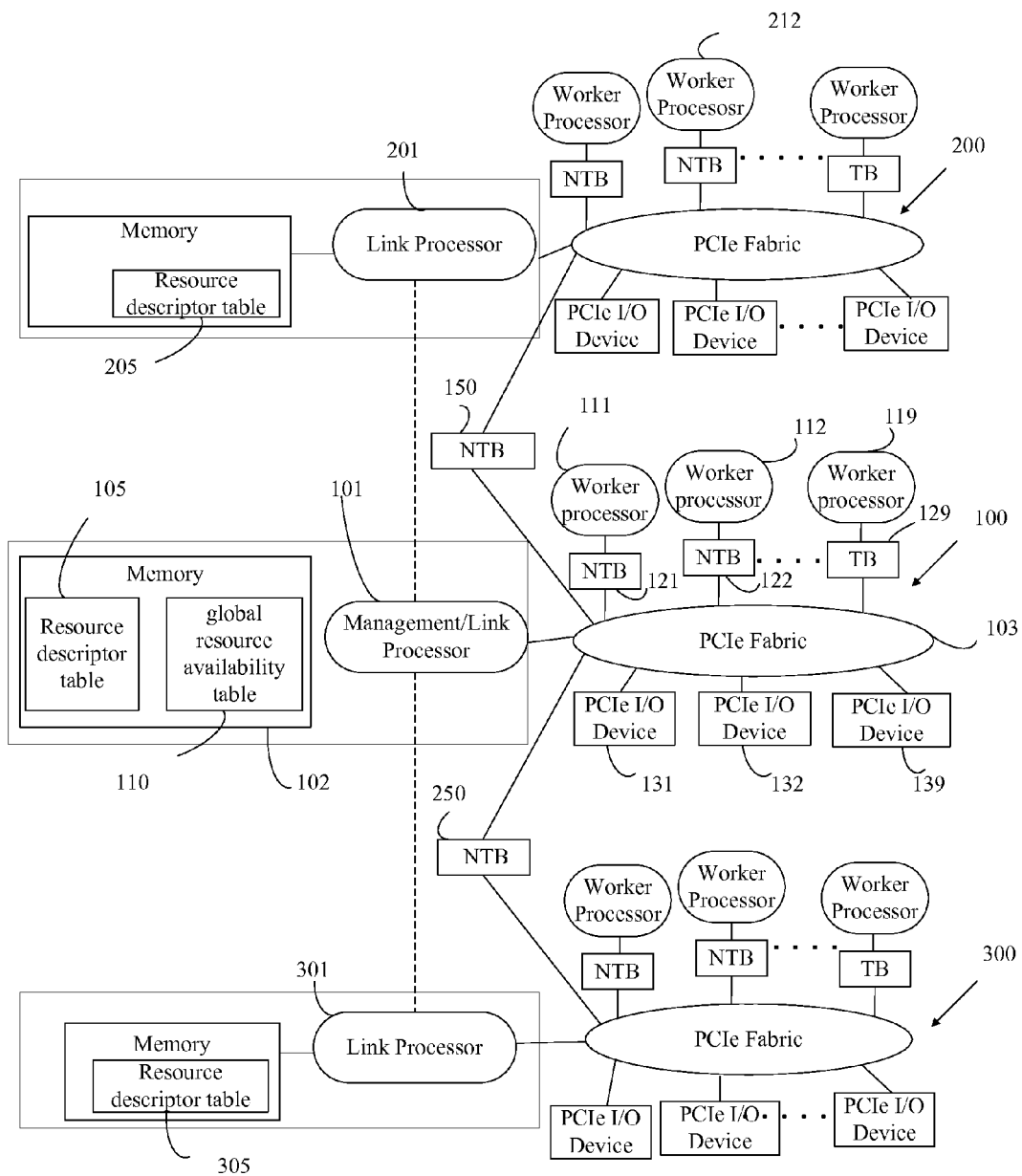
FIG. 1 is a block diagram of a PCIe network including three exemplary PCIe domains.

FIG. 1 illustrates multiple domains interconnected through one or more NTBs. For illustration purpose, there are only 3 PCIe domains 100, 200, 300 shown in FIG. 1. There may be more PCIe domains interconnected via NTBs. The domains 100, 200 are connected via a NTB 150, while the domains 100, 300 are connected via a NTB 250. The domains 100, 200, 300 shown in FIG. 1 are managed by link processors 101, 201, 301 respectively.

Different domains may include different devices with different configuration. For illustration purpose, the domains 100, 200, and 300 shown in FIG. 1 each includes similar devices to other domains and only domains 100 will be described in details. The domain 100 includes the link processor (e.g. a CPU) 101, a PCIe fabric 103, one or more PCIe I/O devices 131-139, and one or more worker processors 111-119. The PCIe fabric 103 comprises one or several PCIe switches (not shown in FIG. 1) that are interconnected with each other. The link processor 101, the PCIe I/O devices 131-139, and the worker processor 111-119 are connected to at least one of the PCIe switches in the PCIe fabric 103.

The link processor 101 serves as the root host of the domain 100 which is responsible for assigning addresses to devices (i.e., worker processors, I/O devices, etc.) connected to the PCIe fabric 103 within the domain 100. The worker processors 111, 112 are connected to the PCIe fabric 103 through Non-Transparent Bridges (NTBs) 121, 122 respectively. The NTB 121 enables isolation of two hosts of different memory domains, the link processor 101 and the worker processor 111, yet allows status and data exchange between the link processor 101 and the worker processor 111. The NTB 121 provides address translation between the memory spaces of the link processor 101 and the work processor 111. With The NTB 121, devices on either side of the bridge are not visible from the other side, but a path is provided for data transfer and status exchange between the memory domains of the link processor 101 and the work processor 111. The NTB 121 has two sets of BARs (Base Address Registers), one for the link processor 101 side and the other for the worker processor 111 side. The BARs are used to define address translating windows into the memory space on the other side of the NTB 121 and allow the transactions to be mapped to the local memory or I/Os.

The worker processor 119 is connected to the PCIe fabric 103 through a Transparent Bridge (TB) 129 in which case they have to be configured as an end-point. The link processor 101 enumerates the system through discovery of bridges and end devices. For TB 129, the Configuration Status Register (CSR) with a "Type 1" header informs the link processor 101 to keep enumerating beyond this bridge as additional devices lie downstream. The worker processor 119, as an end-point device, has a "type 0" header in its CSR to inform the enumerator (i.e., link processor 101) that no additional devices lie downstream. The CSR includes base BAR used to request memory and I/O apertures from the link processor 101.

A PCIe domain (e.g., the PCIe domains 100, 200, or 300) is a PCIe network with its own independent 64-bit address space. The worker processors 111, 112 are connected to the PCIe domain 100 via NTBs 121, 122. Physically, they are in separated domains if NTBs are used. But in this embodiment, the NTBs' job is to map addresses from the PCIe domain 100 into the worker processor's domains, and the worker processors 111, 112 are still under control of the link processor 101, thus, the worker processors 111, 112 can be treated as part of the PCIe domain 100 at a logical level.

When the concept domain is used in this embodiment, as shown in FIG. 1, the worker processors 111, 112 are part of the PCIe domain 100.

In the PCIe domain 100 as shown in FIG. 1, each node (e.g., a worker processor or an I/O device) has two independent addresses. One is a Memory Address (MA) and the other one is a Request ID (RID) in the format of a sequence of 8-bit BUS number, 5-bit DEVICE number and 3-bit FUNCTION number (i.e. B:D:F). When a processor initiates a read or write request for data to one of the node, for example, one of the PCIe I/O devices 131-139, the processor addresses the node using its MA (i.e. the destination address in the packet is going to be the MA of the node) and identifies itself with its RID as the requestor of the data. When the node returns the data (in the case of read) or the acknowledgement packet of data reception (in the case of write), the node uses the processor's RID as the destination address. Thus, if a request packet crosses an NTB on the border of two domains, both the addresses (i.e. MA and RID) have to be translated to avoid address collision in the remote domain and to get the packets (both the request and the subsequent response or completion acknowledgement) to the right node. Note that addresses in a PCIe domain is assigned independently from other PCIe domains, but the address spaces of the PCIe domains may be the same 64-bit address space. As a consequence, there are two address translations happening when a packet crosses an NTB, one translates the MA of the packet, which was originally the MA of the NTB's interface in the originating domain, while the other translation translates the RID. Both of these translation mechanisms are described below.

Figure 2:
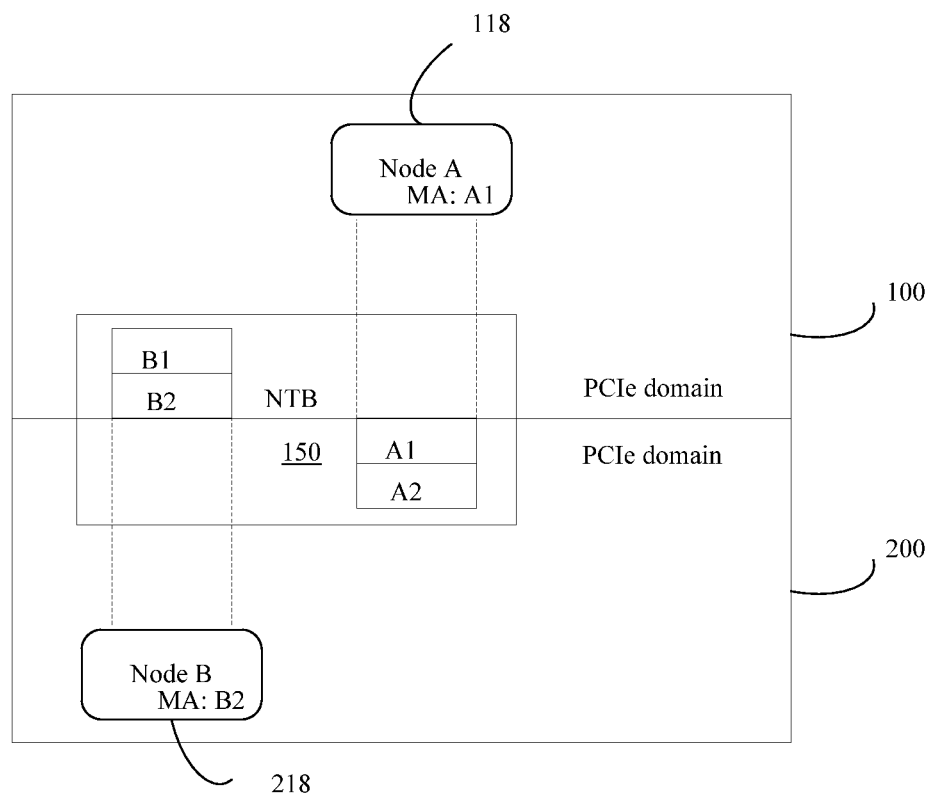
FIG. 2 is a block diagram of two PCIe domains showing memory addresses translations with an inter-domain NTB.

FIG. 2 shows an example for MA address translation. In order to indicate to a PCIe system that there is a device available that can be addressed and accessed, the device is configured with a BAR with an address allocated to it during the enumeration phase. This register is the one that gets physically written to when there is a packet addressed to that side of the NTB. The PCIe domain 100 includes a node A 118 with an MA "A1" assigned by the link processor 101 (not shown in FIG. 2) in the PCIe domain 100. A PCIe domain 200, connected to the PCIe domain 100 via a NTB 150, includes a node B 218 with a memory address B2 assigned by the link processor 201 (not shown in FIG. 2) in the PCIe domain 200.

In order to enable a request node in a domain to access an accessed node in another domain, an address with the same length of the accessed node has to be available in the NTB 150 in the requestor node's domain. For example, in order to access the node A 118 (address A1) in the PCIe domain 100 from the node B 218 in the PCIe domain 200, an address A2 in the PCIe domain 200 with the same length with A1 should be available to be mapped to the address A1 in the PCIe domain 100 in the NTB 150. Nodes in the PCIe domain 200 may access node A 118 by sending data packet to address A2, which will be translated into A1 and forwarded to the node A 118 by the NTB 150. Similarly, in order to access the node B 218 (address B2) in the PCIe domain 200 from the PCIe domain 100, an address B1 with the same length with B2 in the PCIe domain 100 is mapped to the address B2 in the PCIe domain 200. The MA is implemented via Base Address Register (BAR).

Specifically, as an implementation, the NTB 150 holds a translation entry in an address translation table for A2 that is associated with the real address A1 of the node A 118 in the PCIe domain 100. If a packet destined to the A2 of the NTB 150 is received, the destination address in the packet is replaced with A1, the address associated with A2 in the address translation table. Similarly, the NTB 150 also holds a translation entry in an address translation table for B1 that is associated with the real address B2 of the node B 218 in the PCIe domain 200. If a packet destined to B1 of the NTB 150 is received, the destination address in the packet is replaced with the address B2, the address associated with B1 in the address translation table. The address table and the address table may be different parts of a same table.

Figure 3:
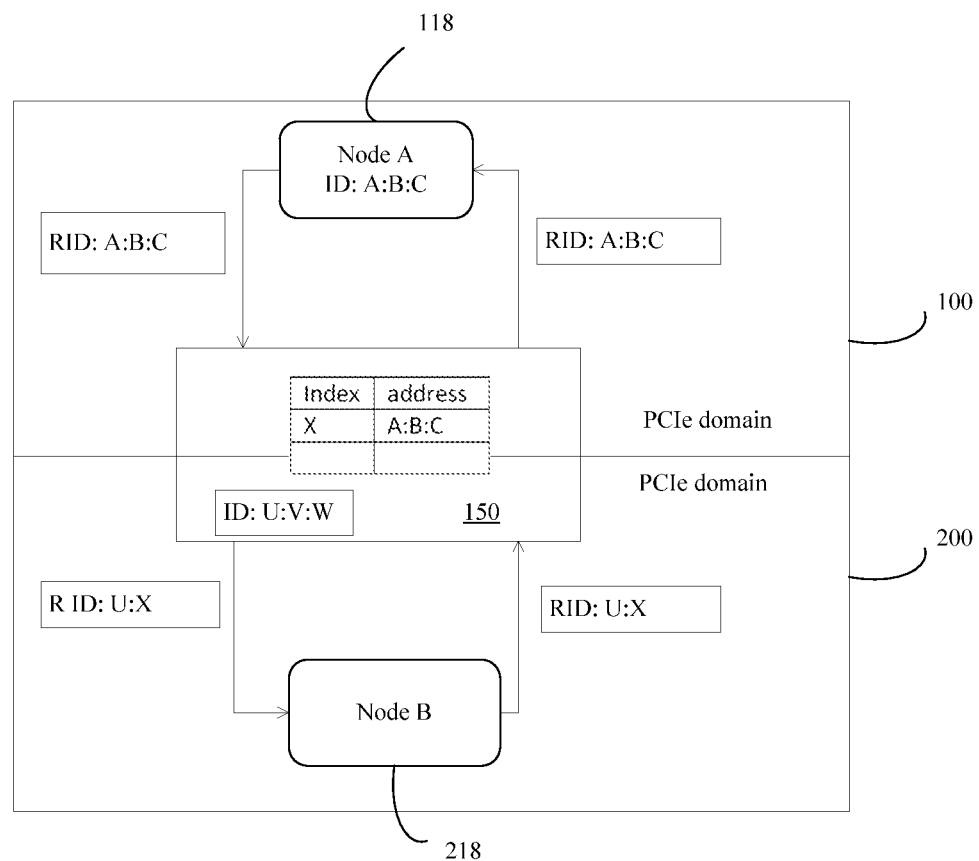
FIG. 3 is a block diagram of a PCIe network of two PCIe domain showing route ID translations with an inter-domain NTB.

As described above, the response or completion packets are routed back to the requestor based on the RID found in a data packet. Thus, if domains are crossed, the RID has to be translated to make sure the response/completion packet is routed back to the appropriate NTB and ultimately to the original requestor node. The translation of the RID address is carried out in a different way than the MA. In the example shown in FIG. 3, the RID of the node A 118 in the PCIe domain 100 is A:B:C, while the RID of the NTB's interface on the PCIe domain 200's side is U:V:W. When a data packet arrived at the NTB 150 destined to the node B 218, the RID in the requestor packet from the node A 118 is inserted into a RID translation table maintained in the NTB 150. The RID of the node A 118 is associated with an index X in the RID translation table. The translated RID for the data packet is created by concatenating the NTB's 8-bit port address and the index X from the RID translation table. That is, the translated RID address for the data packet forwarded in the PCIe domain 200 is U:X, where X is 8-bit long. In some implementation, X is 5-bit long and only replaces the middle 5-bit part of the B:D:F address (i.e. the "D" part only), that is, in this case the new address is going to be U:X:C, where C is the value of the FUNCTION of the original RID.

Once the packet arrives at the destined node B 218 in the PCIe domain 200 and is processed by the node B 218, a response packet is created and destined to U:X (or U:X:C in the alternative example provided above), which will lead the packet to the NTB 150, as BUS address U belongs to the NTB 150. Once the packet is received by the NTB 150, the NTB 150 looks up the RID translation table and translates the address U:X back into A:B:C based on the relationship between the X and A:B:C maintained in the RID translation table. Then the NTB 150 forwards the packet to the node A 118 by targeting RID A:B:C.

Based on different policies, the PCIe domains 100, 200, and 300 may allow processors from remote domains to access resources in a given domain. The policy may be based on availability of resources, or forced sharing of some amount of resources based on central policies, etc. To this end, link processors of the PCIe domains 100, 200, and 300 each constructs a resource descriptor table 105, 205, and 305 and stores it in its memory. A resource descriptor table contains information about resources available to be shared. The resource descriptor tables 205, 305 are forwarded to a management processor 101, which constructs a global resource availability table 110 by merging the tables received from the link processors 101, 201, 301 and uses this collective data to assign resources to processors in remote domains. The management processor 101 takes information needed from the global resource availability table 110 to program inter-domain NTBs through which the traffic between the assigned resource and the request processor is going to flow to enable the communication between a resource and a request processor.

Figure 4:
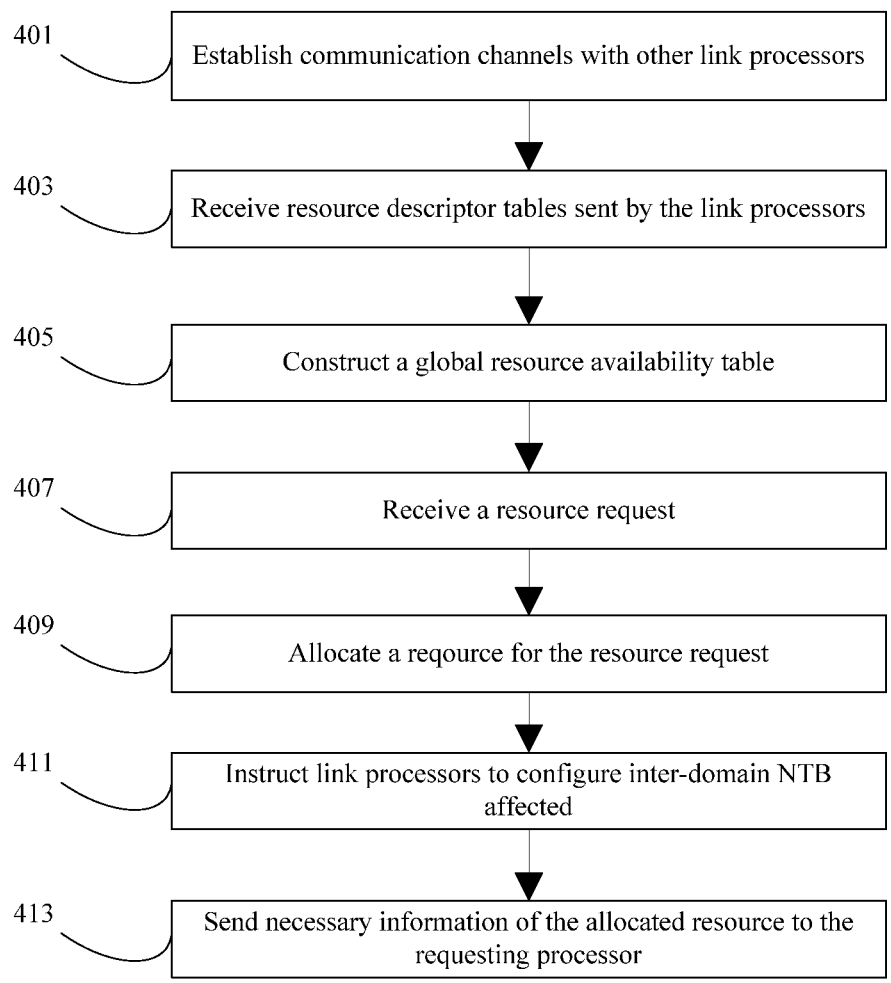
FIG. 4 is a flow chart of a method for managing inter-domain resource allocation in a PCIe network.

As shown in FIGS. 1 and 4, in step 401, the link processor 101 for the PCIe domain 100 establishes a communication channel through the inter-domain NTB 150 with the link processor 201 in the PCIe domain 200. In one realization, the communication channel can be established with the doorbell register(s) present in the inter-domain NTB 150. The doorbell registers are used to send interrupts from one side of the non-transparent bridge to the other. Similarly, another communication channel may be established between the link processor 101 and a link processor 301 in a PCIe domain 300.

Once the communication channel for control messaging is established, the link processors 101, 201, 301 may run a selection algorithm that chooses one of them to be become a management processor—a central controller for the whole interconnection of multiple domains, which in the current embodiment, means the PCIe domain 100, the PCIe domain 200, and the PCIe domain 300. This selection algorithm, for example, (1) can select the link processor with the smallest average distance (i.e. hop-count or latency) to all the nodes in the overall PCIe network, (2) the least utilized link processor, or (3) the link processor with the highest amount of resources to be shared with remote domains. For illustration purpose, in this embodiment, the link processor 101 is selected as the management processor of the interconnection of multiple domains shown in FIG. 1 using one of the algorithms stated above. In this exemplary implementation, the management processor is a logical entity being executed on one of the link processors, the management processor can be a standalone system physically independent from any of the link processors, for example, a processor connected to link processors of the domains connected.

This management processor 101, in the illustrated embodiment, the link processor 101, is in charge of assigning the resources in a domain to nodes in another domain. The resources may be a part or a whole network link via TX/RX queues, storage volumes in the form of a disk/Solid State Drive (SSD) partition or a whole disk or even multiple disks, some amount of extended memory, etc. The management processor 101 is also responsible for controlling how the inter-domain NTB(s) are programmed for enabling resource access across multiple domains. For example, size of BARs in the inter-domain NTB and address values to be loaded into the address translation table entries of the inter-domain NTB. The correct values loaded into the address translation tables enable packets to pass through the NTBs and reach the correct device in the remote domain.

In step 403, the link processors 101, 201, 301 of the domains 100, 200, 300 share resources information with the management processor 101. The information for each resource to be shared includes at least a part of the following information: (1) a domain ID; (2) a type of the resource; (3) a resource ID; (4) the base address and the size of memory address; (5) amount information; (6) additional information. The type of the resource could be networking, storage, memory, Graphics Processing Unit (GPU), Field-Programmable Gate Array (FPGA), etc. Or, the type of the resource may include more specific information, e.g., information about Make, Model, or Function, that not just about the type of the resource, but also can be used to identify which driver to load on a remote processor. The resource ID within a device, depending on the device type, it can be virtual function, channel, queue, etc. In the case there are multiple resources available within the device, (e.g., a fraction of the network bandwidth or a traffic class or a partition of a hard disk, etc.), and these are typically represented by queues, channels or virtual functions. The resource ID can be used to calculate the exact address (i.e. offset from the base address) of the specific resource within the device.

The additional information may include granularity of the resource that can be requested, that granularity information can define how much resource to be returned for a request. The additional information may include time period renewal needed. The time period renewal can be used to automatically free the resource up if no renewal request has arrived within the time period set. The additional information may include usage indicator which may be exclusive, shared, static, or dynamic. Exclusive represent the situation where the resource is only used by a single processor, while shared can mean that the resource access is multiplexed between multiple processors. Static represent the case where the resource is statically assigned to a processor and is all the time in that single processor's possession while dynamic mean that the resource is available for a processor when it wants to use it, but at times when the processor doesn't use it, the resource might be temporarily made available to another processor.

The information of the resources available can be sent to the selected management processor 101 as a structured resource descriptor table 105, 205, 305 through message passing protocol or by creating a message queue in the management processor's memory where data is written to through the inter-domain NTB's doorbell or through Direct Memory Access (DMA) mechanism. In the case a management processor happens to be a link processor of a particular domain like the management processor 101 shown in FIG. 1 is also the link processor 101 of the PCIe domain 100, the management processor 101 itself is capable of obtaining resource information of the PCIe domain 100.

In step 405, the management processor 101 constructs the global resource availability table 110 or a database based on the resource descriptor table 105, 205, 305 received from link processors 101, 201, 301 of the domains 100, 200, 300 in the interconnection. Table 1 shows the exemplary global resource availability table 110 stored in a memory 102 constructed by the management processor 101.

TABLE 1

| Domain ID | Resource Type | Resource ID | base addr. | Addr. length | Amount | |
|---|---|---|---|---|---|---|
| 2 | Intel 82599 | VF 53 | x80005400 | 32768 | 1000 | Mbps |
| 2 | BCM 4395 | VF 20 | x00002040 | 16384 | 500 | Mbps |
| 1 | SATA CNT1 | CH5 | x00506080 | 65536 | 15 | GB |
| 3 | EM | Q2 | x10004000 | 1073741824 | 1024 | MB |

The management processor 101 may allocate suitable resources to a resource request arriving from one of the domains 100, 200, 300. Information listed in Table 1 is just an example; information about available resources sent from link processors (101, 201, 301) to the management processor 101 may include more information than shown in the Table 1, or may only include part of the information listed in Table 1.

The management processor 101 coordinates with link processors involved to program inter-domain NTB(s) that will ultimately allow cross-domain resource access between the link processor 201 and the allocated resource which is located in another domain.

In step 407, as an exemplary implementation, when a compute entity (i.e. Virtual Machine/Container/Application/Task/Job/etc.) is created on a worker processor 212 in the PCIe domain 200, a set of requests are associated with it that describes how much of each resource type (i.e. networking, storage, remote memory, GPU, FPGA, etc.) needs be allocated to the given compute entity. The set of requests is communicated to the link processor 201 of the PCIe domain 200 that tries to match the requests with available resources in the PCIe domain 200. If, for example, there is one request that cannot be served with resources within the PCIe domain 200, the link processor 201 sends a resource request to the management processor 101 to request the unserved resource needed.

In step 409, after receives the resource request, the management processor 101 looks up resources information maintained in the global resource availability (i.e., Table 1), and allocates one or more resources according to a requested type and a requested amount information carried by the resource request. The requested type information may include the desired resource type (e.g., networking, storage, remote memory, GPU, FPGA., etc), or specific information about the Make, Model, or Function.) In the case the requested type information includes the desired resource type, the management processor may search the resource of the same type as requested. In the situation the requested type information includes information about the Make, Model, or Function, dependent on policies. The management processor 101 may only search resources of the same Make Model, or Function. Or the management processor 101 may firstly search resources of the same Make Model, or Function firstly, and then if this cannot be found, the management processor may continue to search other resources of the same type; or, the management processor 101 may search resources of the same type without giving special consideration to the information about Make, Model, or Function information.

In order to fulfill the amount requirement of the resource request, the management processor 101 may only search resources that have at least that much amount of resource left (e.g. network bandwidth, storage capacity, etc.). In addition to the consideration about requested type and requested amount, the management processor 101 may further execute a resource allocation algorithm that aims to find suitable resource for the resource request. The resource allocation algorithm may be based on different rules and conditions of the network and the resources maintained in the global resource availability table. For example, the allocation algorithm may choose the resource closest in terms of latency or hop-count or number of NTBs to be crossed, network load (e.g. choosing a resource that is accessible over a path that has utilization below a certain level, e.g., below 50%, or has a given amount of bandwidth available, such as 10 Gbps), resource utilization (e.g. favoring a device with the same type of resource but lower level of utilization, e.g. in the case of 10 G NICs choosing the one that has more bandwidth available), etc.

In step 411, once the management processor 101 has allocated resource for the resource request, it obtains address information (i.e., the base address and address length) for programming NTB(s). The management processor 101 instructs link processors which are capable of programming inter-domain NTBs being affected with the address information to program the NTBs for enabling the worker processor to get access to these resources allocated by the management processor 101. NTBs being affected means NTBs through which traffic between the worker processor 212 in the PCIe domain 200 and the allocated resource is going to flow. For example, Extension Memory (EM) in the PCIe domain 300 maybe allocated to server the resource request from the worker processor 212 in the PCIe domain 200. In order to enable the worker processor 212 to get access to the EM located in the PCIe domain 300, the NTB 150 connecting the PCIe domain 100 and the PCIe domain 200, and the NTB 250 connecting the PCIe domain 100 and the PCIe domain 300, are the NTBs needed to be programmed.

A link processor on a side of a NTB would be able to program the NTB. The NTB 150 can be programmed by the management processor 101 (the link processor), or the processor 201 on the other side of the NTB. The NTB 250 can be programmed by the management processor 101 or the link processor 301 on the other side of the NTB 250. Thus, the management processor may program the NTB 150 and NTB 250 by itself, or instruct the link processor 201 to program the NTB 150, and link processor 301 to program the NTB 250. With address information (i.e., the base address and the address length) from the global resource availability table, the NTB and NTB can be programmed to allow the worker processor 212 get access to the EM in the PCIe domain 300.

In step 413, once the NTBs 150, 250 have been programmed, the management processor 101 notifies the link processor 201 in the requesting processor's domain with necessary information, which in consequence is going to notify the requesting processor and provides the necessary information needed by the requesting processor (the worker processor 212). The necessary information may include type of the allocated resource from the global availability table, base address of the device (the mapped local address in the requesting processor's domain of the device), and/or Resource ID. The type of the allocated resource may be, for example, Intel 82599 or Broadcom BCMxyz, in the current embodiment, is EM. The type of the allocated resource can help the requesting processor to load the appropriate driver. The resource ID may identify which queue/channel/VF of the resource is accessible.

Once the Compute Entity completes its job, the Link processor gets notified, which in consequence notifies the management processor 101. The management processor 101 takes the necessary actions to free the previously allocated remote resources, including clearing the programmed NTBs.

The embodiment of the invention uses a management processor to collect information about available resources for a whole interconnection of multiple PCIe domains and assign the resources in a PCIe domain to nodes in another PCIe domain. Resources of the multiple PCIe domains can be utilized efficiently.

Persons of ordinary skill in the art should appreciate that, in combination with the examples described in the embodiments herein, units and algorithm steps can be implemented by electronic hardware, or a combination of computer software and electronic hardware. Whether the functions are executed by hardware or software depends on the specific applications and design constraint conditions of the technical solutions. Persons skilled in the art can use different methods to implement the described functions for every specific application, and the different method to implement the described functions should not be considered as beyond the scope of the present application.

When being implemented in the form of a software functional unit and sold or used as a separate product, the functions may be stored in a computer-readable storage medium. Based on such understanding, the technical solutions of the present application essentially, or the part contributing to the prior art, or part of the technical solutions may be implemented in a form of a software product. The computer software product may include instruction or instructions for instructing a computer device, or more specifically, one or more processor in the computer device together with a memory (the computing device may be a personal computer, a server, a network device, or the like) to execute all or part of the steps of the method described in each embodiment of the present application. The storage medium includes any medium that can store program codes, such as a U-disk, a removable hard disk, a read-only memory (ROM), a random access memory (RAM), a magnetic disk, or an optical disk.

What is claimed is:

1. An apparatus for managing inter-domain resource allocation in a Peripheral Component Interconnect-Express (PCIe) network which includes a plurality of PCIe domains each managed by a link processor and connected to one or more other domains via a non-transparent bridge (NTB), comprising:
    a memory;
    a management processor coupled with the memory, the management processor configured to:
    obtain information about available resources of the domains reported by each domain's link processor, wherein the information about available resources includes memory address of each available resource reported;
    store the obtained information about the available resources in the memory;
    receive a resource request from a requesting processor of one of the domains;
    in response to the resource request, allocate a resource of the available resources to the requesting processor, wherein the allocated resource resides in a domain different from the domain with the requesting processor;
    obtain memory address information of the allocated resource from the memory;
    instruct one or more link processors to program one or more inter-domain NTBs through which the traffic between the allocated resource and the requesting processor is going to flow according to the memory address information of the allocated resource, to allow cross-domain resource access between the requesting processor and the allocated resource.

2. The apparatus according to claim 1, wherein the information about the available resources reported includes information about type of each resource.

3. The apparatus according to claim 2, wherein the information about type includes information about Make, Model, or Function of an available resource for identifying a driver to load for a processor.

4. The apparatus according to claim 3, the management processor further configured to send information about the type of the allocated resource obtained from the memory to the requesting processor for identifying a driver to be load to the requesting processor.

5. The apparatus according to claim 1, wherein the memory address of each available resource includes base address and the size of the memory address.

6. The apparatus according to claim 1, wherein the information about the available resources reported includes amount information of each available resource.

7. The apparatus according to claim 1, wherein the management processor allocates the resource by searching the information about the available resources stored the memory according to information about a requested type and a request amount carried in the resource request.

8. The apparatus according to claim 7, wherein the management processor allocates the resource by further performing an allocation algorithm to determine the resource closest in terms of latency, hop-count, or number of NTBs to be crossed.

9. A method for managing inter-domain resource allocation in a Peripheral Component Interconnect-Express (PCIe) network which includes a plurality of PCIe domains each managed by a link processor and connected to one or more other domains via a non-transparent bridge (NTB), the method comprising:
    obtaining information about available resources of the domains reported by each domain's link processor, wherein the information about available resources includes a memory address of each available resource reported;
    storing the obtained information about the available resources in a memory;
    receiving a resource request from a requesting processor of one of the domains;
    in response to the resource request, allocating a resource of the available resources to the requesting processor, wherein the allocated resource resides in another domain different from the domain with the requesting processor;
    obtaining memory address information of the allocated resource from the memory;
    instructing one or more link processors to program one or more inter-domain NTBs through which the traffic between the allocated resource and the requesting processor is going to flow according to the memory address information of the allocated resource, to allow cross-domain resource access between the requesting processor and the allocated resource.

10. The method according to claim 9, wherein the information about the available resources reported includes information about type of each resource.

11. The method according to claim 10, wherein the information about type includes information about Make, Model, or Function of an available resource for identifying a driver to load for a processor.

12. The method according to claim 11, further comprising sending information about the type of the allocated resource obtained from the memory to the requesting processor for identifying a driver to be load to the requesting processor.

13. The method according to claim 9, wherein the memory address of each available resource includes base address and the size of the memory address.

14. The method according to claim 9, wherein the information about the available resources reported includes amount information of each available resource.

15. The method according to claim 9, wherein the resource is allocated by searching the information about the available resources stored the memory according to information about a requested type and a request amount carried in the resource request.

16. The method according to claim 15, wherein the resource is allocated by further performing an allocation algorithm to determine the resource closest in terms of latency, hop-count, or number of NTBs to be crossed.

* * * * *